Oct. 31, 1967     H. M. DEMAREST, JR., ET AL     3,350,248

GLASS PREPOLISHING METHOD AND APPARATUS

Original Filed Sept. 20, 1962     2 Sheets-Sheet 1

INVENTORS
Henry M. Demarest, Jr.
John S. Sieger

Wolfe, Hubbard, Voit & Osann
Attys.

Oct. 31, 1967  H. M. DEMAREST, JR., ET AL  3,350,248
GLASS PREPOLISHING METHOD AND APPARATUS
Original Filed Sept. 20, 1962  2 Sheets-Sheet 2
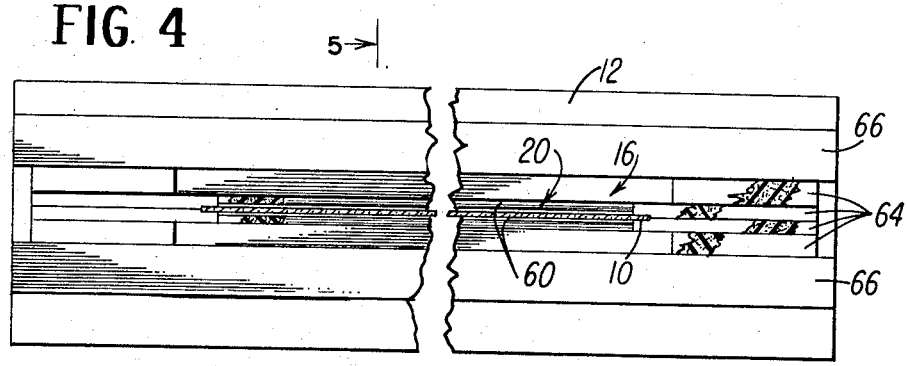
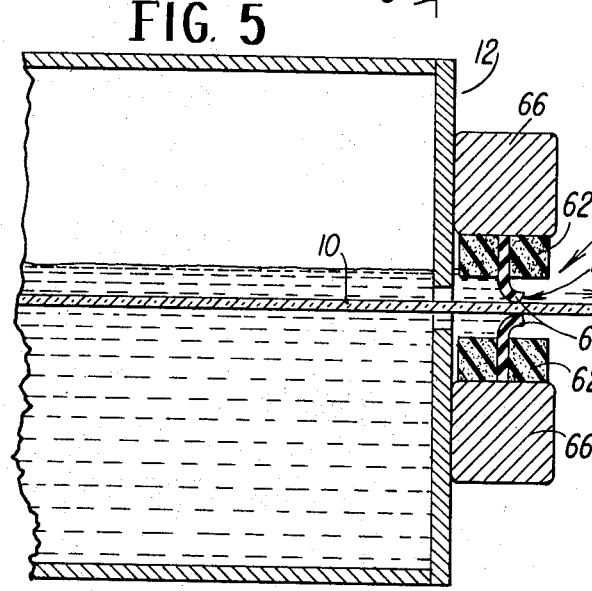
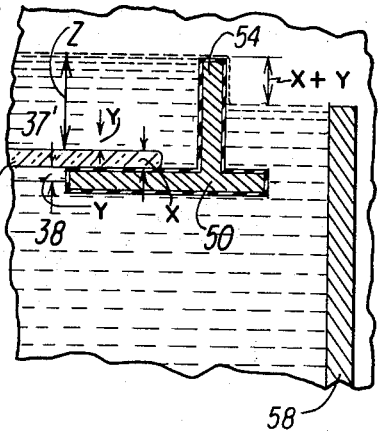
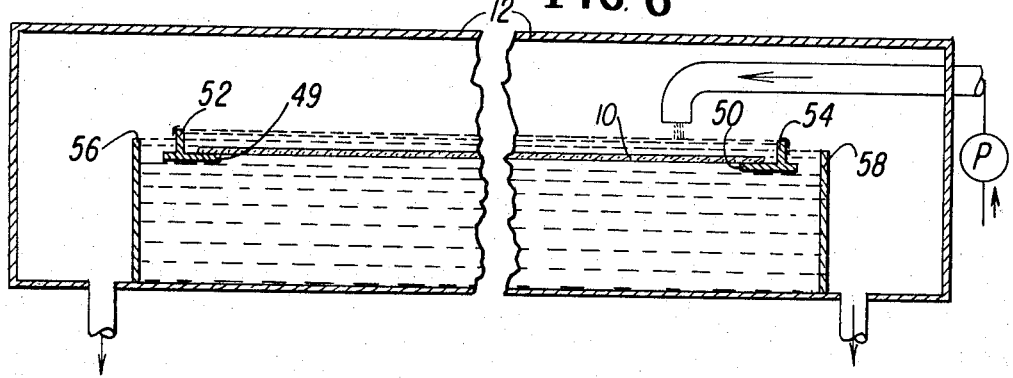
INVENTORS
Henry M. Demarest, Jr.
John S. Seiger
Wolfe, Hubbard, Voit & Osann
Attys.

United States Patent Office 3,350,248
Patented Oct. 31, 1967

3,350,248
GLASS PREPOLISHING METHOD AND
APPARATUS
Henry M. Demarest, Jr., Natrona Heights, and John S. Sieger, Allison Park, Pa., assignors to Pittsburgh Plate Glass Company, Pittsburgh, Pa., a corporation of Pennsylvania
Continuation of application Ser. No. 224,972, Sept. 20, 1962. This application Aug. 27, 1964, Ser. No. 394,377
14 Claims. (Cl. 156—24)

This invention relates to manufacture of plate glass and, more particularly, to improvements in method and apparatus employed in chemical prepolishing or clearing of ground plate glass.

This application is a continuation of our copending application Ser. No. 224,972, filed Sept. 20, 1962, now abandoned, and entitled "Prepolishing Apparatus."

A method of chemical prepolishing ground glass forms the subject matter of United States Patent No. 2,936,554. Apparatus described in this patent as suitable for simultaneous prepolishing of both ground sides of twin ground uncut glass ribbon includes a stationary solution tank on the glass line and a washer stationed immediately downstream of the tank. The ribbon in its continuous travel passes through the solution in the tank so as to subject both surfaces of the glass to chemical attack to remove a predetermined thickness of glass from both surfaces. The solution level in the tank of necessity is maintained high enough to cover the glass ribbon so that the solution attacks both surfaces, and the glass ribbon at entrance to and exit from the tank passes through seals which confine the solution to the tank and, at the exit aperture, also wipe sludge which forms on the ribbon during passage through the tank. The surfaces of the wiped glass emerging from the exit aperture seal are promptly flushed with water at the washer station to clear the ribbon of any remaining solution.

In the practical application of chemical prepolishing using such a prepolishing tank, large variations have been experienced in the quality of the surface finish produced on the ribbon. Various types of surface finish defects have been observed. These defects are apparently attributable to conditions at the entrance and exit aperture seals which affect the uniformity of application of chemical solution to the glass ribbon surfaces.

Accordingly, the major object of the present invention is to provide for sealing the tank at ribbon entrance and exit, and for wiping the cleared ribbon free of sludge and solution, by apparatus which will uniformly apply the chemical solution to and remove it from the glass ribbon surfaces.

A more specific object of the invention is to uniformly apply the chemical solution to the glass ribbon at the entrance aperture where high chemical attack rates amplify minute variations in uniformity of application tending to produce severe surface finish defects.

Another object is to eliminate squeegee marks in the glass ribbon produced by mechanical entrance squeegees which leave traces of their contact.

Another object is to provide an entrance seal through which the glass ribbon may be initially threaded without trapping air under the ribbon.

Various objects and advantages of the invention will become apparent from the following description of the invention read in connection with the accompanying drawings, in which:

FIG. 4 is an elevational view of the exit side of the tank with the center section of the tank broken out;

FIG. 5 is a fragmentary longitudinal sectional view taken in the plane of lines 5—5 of FIG. 4;

FIG. 6 is a transverse sectional view of the tank illustrating the arrangement of weirs therein providing two solution levels in the tank; and FIG. 7 is an enlarged fragmentary transverse sectional view illustrating the arrangement of weirs.

Figure 1:
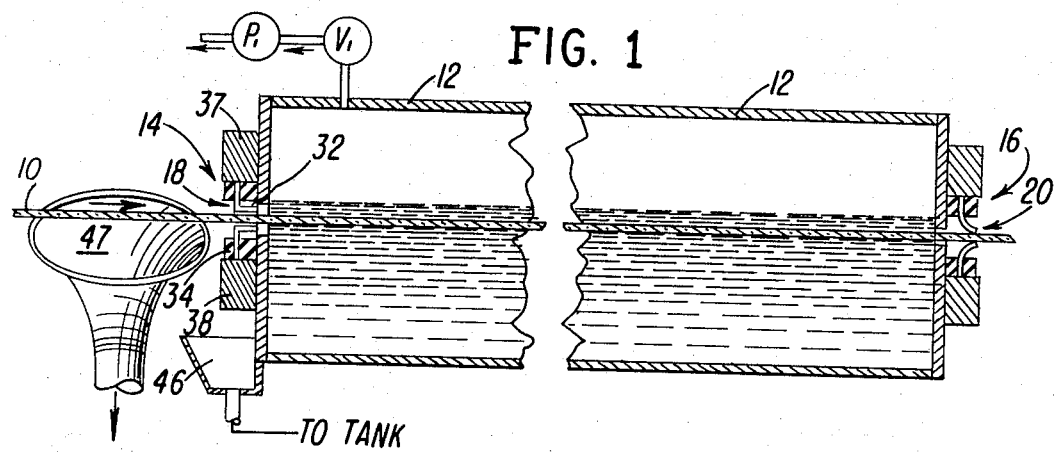
FIGURE 1 is a longitudinal sectional view of a prepolishing tank with a glass ribbon passing through the tank and a section of the tank broken out.

While a preferred form of the invention has been shown and will be described in detail herein, there is no intention to limit the invention to the specific form shown or to use in the particular environment in which it has been illustrated. On the contrary, the intention is to cover and secure all modifications, adaptations, alternative constructions, and equivalents, as well as other types of installations for which it is suited and which fall within the spirit and scope of the appended clams.

General considerations

In following the method set forth in Patent No. 2,936,554, the surfaces of a ribbon of ground plate glass approximately 10 feet wide for a time during its continuous travel are flooded with a glass attacking acid in aqueous solution. This is shown schematically in FIG. 1 wherein the glass ribbon 10 enters a glass solution tank 12. General apparatus considerations are set forth in the patent, which will be briefly reviewed. The glass attack is controlled by timing the application and removal of the prescribed solution, and care is taken to avoid either limiting or accelerating the removal by chemical change due to depletion or dilution, or by physical disturbance of a sludge layer which forms on the ribbon during the glass attacking period. The rate of glass attack is not apparently hampered by the presence of the visible and growing sludge layer formed soon after ground glass surfaces are contacted by solution. However, the initial attack rate before the sludge becomes evident is higher than the subsequent rate and it appears that the initial glass surface invites a different attack by the solution. The timing of the attack period is advantageously short, in the order of 20 to 60 seconds, to take advantage of the high initial removal rate. Coincident with timing of the attack period for producing the initial clearing action is the effective application and removal of the solution. Since the initial reaction rate appears to be quite high, the glass surfaces which are preferably presented to the prepolishing solution completely dry, are desirably wetted uniformly over the area to be polished and splashing of solution or uneven application on dry areas is avoided. Support of the ribbon during the attack period at its ultimately severed margins, avoids physical interference with the glass contacting solution layer over the usable areas of both surfaces of the ribbon.

Flooding the glass surfaces with solution uniformly across the width of the ribbon without splashing has been approached by passing the glass ribbon through a solution tank 12 in which the level of the solution is above the glass so that it is fully immersed. It is with this type of apparatus and the problems encountered in practice that the present invention is principally addressed.

One problem has been to provide adequate tank seals around the ribbon at entrance 14 and exit 16. Rubber squeegees in wiping engagement with the top and bottom surfaces of the ribbon and tightly fitting rubber blocks around the edges of the ribbon have been found to provide a partial answer. Blocking of edge leakage by such means, however, has been only partially successful. Some leakage occurred which ran along the squeegees ahead of the tank toward the middle of the ribbon due to the sag in the center caused by the weight of the ribbon. This left visible evidence of a different and variable degree of chemical attack during prepolishing, producing objectionable defects. Even where leakage did not occur, defects have been encountered from a gradual accumulation on the entrance squeegee of grinder sand and other foreign materials, small amounts of which are left on the ground ribbon even after extensive scrubbing and washing.

Such objectional defects attributable to mechanical entrance squeegees are characteristically continuous surface defects extending parallel to the ribbon edges in the form of depressions having a depth of about ¼ micron and a width up to about ¼ inch, named "squeegee marks." Such defects, it has been determined through extensive tests, are primarily attributable to the entrance squeegee, not to the exit squeegee, as might be supposed, although exit squeegees may also leave evidence of contact, for example, in the form of a line defect due to a chunk of sludge being caught between the squeegee blade edge and the glass.

It is believed that squeegee marks are left by rubber entrance squeegees whenever there is a disturbance to the glass surface affecting the uniformity of chemical solution application to the ribbon across its full width, for example, due to a change in configuration of the surface of the squeegee at the point of contact with the glass as might be caused by a foreign particle such as sand caught on the squeegee blade or by a bubble hanging on the trailing edge of the blade. The effect of variation in uniform chemical solution attack at the entrance squeegee blade is amplified because of the high initial attack rate of the clearing solution so as to produce meaningful acceleration or deceleration of the action by the solution on the glass and rate of glass removal at the point of interference. The severity of "squeegee mark" type defects also depends on the character and cause of the change in configuration of the squeegee at the point of contact with the glass. Squeegee marks may, of course, be erased by polishing but for prepolishing to be an effective first step the defects produced in the prepolishing stage itself must be held below a commercially acceptable level.

Specific embodiment

FIG. 1 illustrates prepolishing equipment for installation between the grinding and polishing sections of a glass line. Such equipment is suitable for simultaneous prepolishing of both ground sides of twin ground, uncut glass ribbon.

As may be seen in FIG. 1, a continuous glass ribbon 10 enters a stationary solution tank 12 on the glass line. A bottom roll (not shown) suitably supports the glass ribbon before its passage into the tank and prevents excessive sag in the middle of the ribbon. Entrance and exit aperatures 14 and 16 (FIGS. 4 and 5) are defined in the walls of the tank 12 for the ribbon in its continuous travel, while entrance and exit seals 18 and 20 mounted adjacent the respective apertures and embracing the ribbon to seal the tank, substantially, and to remove the reaction products from the surfaces of the ribbon as it moves downstream toward the washers.

In the practice of the invention, a continuously moving ribbon of glass, either a separate cut sheet of ground glass or an uncut ribbon of glass, is threaded through the entrance aperture 14 into the prepolishing tank 12, out the exit aperture 16, and moved continuously downstream to the washers. According to the inventoin, the solution in the tank 12 is applied to and removed from the ribbon so as to obtain accurately controlled uniform application of solution to both surfaces of the ribbon. Uniform application of solution to the ribbon is achieved, in the present case, by means of an entrance seal 18 which is free from mechanical contact with surfaces of the glass ribbon. Removal is achieved by a mechanical exit squeegee 20 mounted at the exit aperture 16 and serving the end of removing the solution and reaction product buildup from both surfaces of the ribbon in the requisite uniform manner while sealing against outflow and downstream flow of tank solution.

Figure 2:
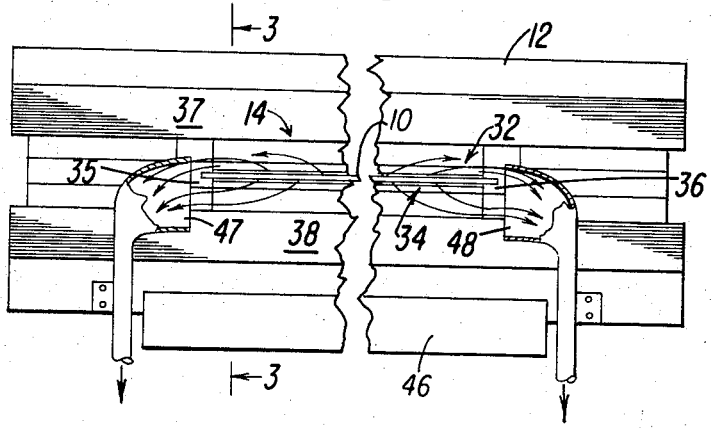
FIG. 2 is an elevational view of the entrance side of the solution tank with the center section of the tank broken out.
Figure 3:
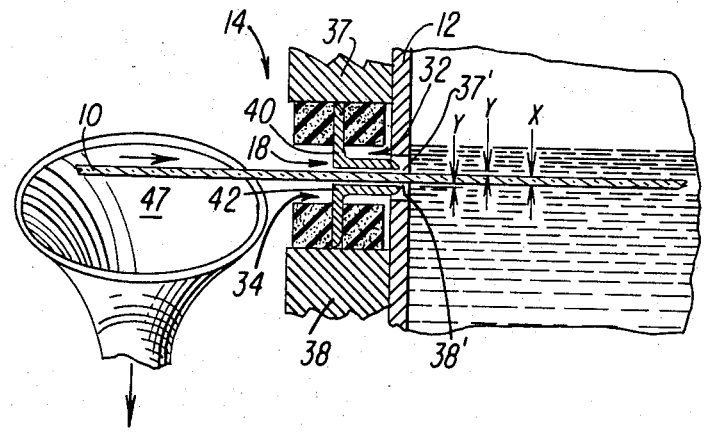
FIG. 3 is a fragmentary, longitudinal, sectional view of the tank entrance seal taken in the plane of lines 3—3 of FIG. 2.

Turning now to FIGS. 1–3 for details of the entrance seal, said seal depends upon maintaining a pressure balance between exterior atmospheric pressure and hydrostatic pressure within the solution in the tank, which effect is produced by reducing the pressure in the space inside the tank above the solution, in cooperation with sealing fixtures 32, 34 immediately adjacent the surfaces of the ribbon which are effective to utilize the pressure balance to limit solution outleak. The expression "hydrostatic pressure" as hereinafter used means the pressure existing within the solution at a given level due to the height of the fluid column above this level and the pressure in the tank above the solution. Tightly fitting rubber blocks 35, 36 around the edges of the ribbon seal against edge leakage. How the sealing fixtures operate may be seen by referring to FIG. 3 which depicts the fixtures mounted adjacent the entrance aperture.

Such entrance seal fixtures 32, 34 are mounted on the outside of the tank 12 and include support bars 37, 38 extending transversely above and below the ribbon carrying means defining restricted slots 37', 38' above and below the glass ribbon. In the present case such fixture slots are defined by beams 40, 42 supported in facing relation by such bars with the ribbon passing between. In keeping with the invention, the restricted slots 37', 38' are formed so as to be elongated longitudinally of the ribbon. Rigid angles 40, 42 of material resistant to corrosion by the solution in the tank, preferably a material such as Monel metal, have been found suitable for the slot forming beams. The angle legs project within the aperture in the wall of the tank such that the ribbon passes into the tank without contact with the angles or with the walls of the tank.

As an optimum condition of operation of the entrance fixtures, the ribbon is simultaneously wetted with solution entirely across its width on both surfaces. It will be appreciated that numerous factors come into play in achieving such operating conditions such as, rate of ribbon movement, viscosity of the chemical solution which affects the rate at which fluid will creep outward along the ribbon surfaces, slot dimensions, and pressure differential. These and other factors must be considered in order to obtain conditions which will sufficiently approach optimum to produce a commercially acceptable product. For example, it has been found that with chemical solution in the tank formulated in accordance with the specifications given in Patent No. 2,936,554, a satisfactory slot dimension is about .030" for the elevation of the slots 37', 38', as seen in FIG. 3, with an effective slot length substantially greater than the thickness of the glass and preferably about 2". Monel angles (2" x 2" x ¼") have been used for the beams 40, 42 with satisfactory results.

The foregoing restricted slot dimensions were used in apparatus on a high speed glass line. With this apparatus it has been found preferable to operate the tank at a high enough (reduced) pressure to avoid inrush of air through the top slot which agitates the solution and tends to mark the glass. Therefore, the pressure within the tank is preferably reduced precisely by means of the pump P1 and suitable gauges and valves V1 to balance atmospheric pressure at the top clearance slot 37' against hydrostatic pressure at this level. Solution outleak through the lower slot 38' due to the head and resulting higher hydrostatic pressures at the lower slot level does not seriously impair operating efficiency if kept within reasonable limits. In practice some outleak through the lower slot 38' is desired to prevent air from being drawn under the ribbon.

Any solution outleak may be recovered in a collection trough 46 mounted under the fixture assembly at the entrance to the tank, providing means for immediately removing the spilled fluid from the collection point under the glass ribbon to limit the quantity of fumes given off by such fluid tending to flow upward and possibly affect the under surfaces of the glass ribbon before its entry into the prepolishing tank. Other precautions must be taken to insure uniformity of both surfaces of the glass ribbon prior to its entrance into the prepolishing tank and for this purpose it is preferred to employ air blowers to dry the ribbon immediately upstream of the tank 12. It has been found that any disturbance in the ribbon surface due to splash marks from the washers upstream of the prepolishing tank, for example, will have a direct influence upon the rate of initial attack of the solution in the tank and affect the quality of prepolish.

As a further means to this end, exhaust nozzles 47, 48 adjacent the edges of the ribbon at above the collection trough 46 suck any rising fumes from fluid in the trough away from the ribbon to prevent such fumes from rising over the ribbon where they may condense and fall on the ribbon.

For limiting solution outleak through the lower clearance slot, means are provided for maintaining substantially the same hydrostatic pressure at the level of the lower slot as prevails at the level of the slot adjacent the top surface of the ribbon. For this purpose, referring to FIGS. 6 and 7, the interior of the tank 12 is provided with means whereby two levels of solution are maintained. The lateral margins of the glass ribbon in moving continuously through the tank are supported by horizontal flanges 49, 50 extending longitudinally of the tank. Such flanges prevent excessive sagging of the glass within the tank in a longitudinal direction and may be coated or surfaced with rubber or other material which, when wetted by solution, provides reasonably low friction guide surfaces. In the present case, each such flange also supports a vertical strip 52, 54 which extends the full length of the tank and provides a weir with its companion strip on the opposite side of the tank. These weirs 52, 54 form a shallow pan, preferably about ½" deep with the weirs and the tank ends as the sides and the surface of the glass ribbon as the bottom of the pan. Solution is continuously fed to the pool over the glass through means herein shown as a supply conduit and pump P and flows laterally over the weir edges. A second solution level is provided by a second set of longitudinally extending strips providing weirs 56, 58 in the tank 12, which are positioned laterally outwardly of the guide flanges or glass surface flooding weirs 52, 54 such that the overflow from the pool over the glass passes into the lower level in the tank and the second set of weirs 56, 58 determines the height of the second level.

With this arrangement the hydrostatic pressure in the solution can be maintained the same at the top and bottom clearance slots. Since the pressure in the tank acts on both levels of fluid, the hydrostatic pressure at a point just under the ribbon is a function of the vertical distance from that point to the lower solution level while the hydrostatic pressure at a point just above the ribbon is a function of the distance from that point to the higher solution level. With the clearance slot above and below the glass being the same distance Y, and the glass thickness being X, and the depth above the glass in the higher level pool being the distance Z, it will be seen that the distance between the midpoint of the upper clearance slot and the midpoint of the lower clearance slot is equal to $(Y/2+Y/2+X)$, which is equal to $(X+Y)$. By setting the difference between the heights of the weirs at substantially that distance, $X+Y$, taking into account overflow height so that the difference between the levels of the pools equals such distance $(X+Y)$, the hydrostatic pressure in the clearance slots above and below the glass will be the same regardless of the pressure within the tank in the space above the pool. Further, by setting the pressure above the pool at $$\left[(\text{atmospheric pressure})-Z+\frac{Y}{2}\right]$$

the hydrostatic pressure at the midpoint of the upper clearance slot will be equal to atmospheric pressure. Since the pressure at the midpoint of the upper clearance slot 37' is the same as the hydrostatic pressure at the midpoint of the lower clearance slot 38', both hydrostatic pressures will be balanced against outside atmospheric pressure, tending to seal the solution in the tank on both surfaces of the glass.

As a practical matter such provision will seal against excessive flow but some flow from the lower slot will still be desirable under operating conditions to prevent air from being drawn into the tank under the glass ribbon. This may be achieved by suitable fine adjustment of pressure within the tank. A collection trough 46 under the seal receives this outflow and connections from the trough to the tank through the pump P with suitable provision for filtering the fluid may be provided to return fluid to the system.

Removal of reaction products may be expediently be achieved at the exit aperture by gum rubber squeegees 60, as shown in FIG. 5. Exit squeegee blades are carried by transverse support members 66 fixed to the outside of the tank. While it is preferred to use some means for sealing at the entrance aperture which utilizes non-mechanical sealing means, at the exit aperture the attack rate of the solution has slowed to a point where substantially uniform removal may be obtained by conventional gum rubber squeegees, and it has been found in practice that squeegees as shown in FIG. 5 work satisfactorily at the exit aperture for significant periods of time and produce prepolished glass substantially free from squeegee marks. A similar arrangement to that employed at the tank entrance may be used for sealing the edges of the ribbon at the exit aperture, herein shown in FIG. 4 as light sponge rubber blocks 64. Such blocks are held firmly between members 66 fixed on the downstream wall of the tank 12.

With this arrangement, means are provided at both entrance and exit for tank sealing, and for affording uniform application of solution to the glass across its width with removal of reaction products from the glass surfaces leaving the latter substantially clean for movement downstream to washers or to other glass line stages.

We claim as our invention:

1. A process for chemically treating both surfaces of a glass ribbon simultaneously with a body of chemical solution within a tank having entrance and exit apertures located below the surface level of the body of chemical solution, said process comprising the steps of leading the glass ribbon up to the tank and through said entrance aperture while continuously maintaining the ribbon spaced apart from the edges of the entrance aperture throughout its width so as to define horizontal, vertically restricted upper and lower slots adjacent the upper and lower ribbon surfaces respectively whereby the surfaces of said ribbon are maintained free from mechanical contact, evacuating said tank above said solution by an amount reducing the hydrostatic pressure of the solution in the tank at the level of said upper slot to substantially atmospheric pressure so as to provide a pressure balance between the inside and outside of said tank and said restricted slots tending to seal said entrance aperture against solution outleak and air intake, continuously moving the glass ribbon through the tank while maintaining the ribbon immersed in the solution below the surface thereof, and withdrawing the glass ribbon from the tank through said exit aperture.

2. A process for chemically treating both surfaces of a glass ribbon simultaneously with a body of chemical solution within a tank having entrance and exit apertures located below the surface level of the body of chemical solution, said process comprising the steps of threading the glass ribbon through said entrance aperture while continuously maintaining the ribbon spaced apart from the edges of the entrance aperture throughout its width so as to define continuous horizontal, vertically restricted clearances between the ribbon surfaces and the edges of said aperture whereby the ribbon surfaces are maintained free from mechanical contact, evacuating said tank above said solution by an amount reducing the hydrostatic pressure of the solution in the tank at the upper surface of the glass ribbon sufficiently to provde a balance between the hydrostatic pressure inside the tank and the atmospheric pressure outside the tank whereby the restricted clearance above the glass ribbon is sealed against solution outleak and air intake, continuously moving the glass ribbon through the tank while maintaining the ribbon immersed in the solution below the surface thereof, and withdrawing the glass ribbon from the tank through said exit aperture.

3. A process for chemically treating both surfaces of a glass ribbon simultaneously with a body of chemical solution within a tank having entrance and exit apertures located below the surface level of the body of chemical solution, said process comprised of the steps of leading the glass ribbon up to the tank and through said entrance aperture while continuously maintaining the ribbon spaced apart from the edges of the entrance aperture substantially throughout its width so as to define horizontal, vertically restricted upper and lower slots adjacent the upper and lower ribbon surfaces respectively whereby the glass ribbon is maintained free from mechanical contact with said tank, evacuating said tank above said solution by an amount sufficient to reduce the hydrostatic pressure of the solution in the tank at the level of said upper slot to substantially atmospheric pressure so as to provide a pressure balance between the inside and outside of said tank tending to seal against solution outleak and air intake through said upper slot with limited solution outleak through said lower slot, withdrawing said solution outleak from said lower slot downwardly away from said ribbon, drawing off fumes rising from said solution outleak laterally of said ribbon so as to avoid any reaction of said fumes with the glass ribbon, continuously moving the glass ribbon through the tank while maintaining the ribbon immersed in the solution below the surface thereof, and withdrawing the ribbon from the tank through said exit aperture.

4. In an apparatus for simultaneous chemical treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means for uniform application and removal of solution to the glass surfaces comprising means at said entrance aperture free from contact with said ribbon substantially throughout its width and defining vertically restricted, horizontal upper and lower slots adjacent said upper and lower ribbon surfaces respectively, means for evacuating said tank above said solution by an amount reducing hydrostatic pressure of the solution in the tank at the level of said upper slot to substantially atmospheric pressure whereby to provide a pressure balance between inside and outside said tank at said restricted slots tending to seal said entrance aperture without contacting the glass by mechanical members, and squeegee means at said exit aperture for wiping a substantial portion of reaction products from the glass surfaces as the latter leave the tank.

5. In an apparatus for simultaneous chemical treatment of both top and bottom surfaces of a glass ribbon including a tank for chemical solution having entrance and exit apertures, and means for continuously moving the glass ribbon through the tank immersed in the solution below the surface thereof passing in and out said apertures, the improvement comprising, means for maintaining a fixed depth of solution above the top ribbon surface, means for limiting leakage of solution from the tank at one of said apertures without contacting the glass by mechanical members comprising transverse members carried above and below the ribbon at said one of said apertures free from contact with said ribbon substantially throughout its width and defining horizontal, vertically restricted slots adjacent the ribbon surfaces above and below the ribbon communicating between solution inside and atmosphere outside the tank, and means for evacuating the space in the tank above the solution by an amount reducing hydrostatic pressure of the solution in the tank at the level of the slot above the ribbon due to said fixed depth of solution to substantially atmospheric pressure and thereby balance such reduced hydrostatic pressure to substantially seal against solution outleak through said slot above the ribbon.

6. In a glass line apparatus for simultaneous chemical treatment of both surfaces of a glass ribbon including a tank for chemical solution having entrance and exit apertures, and means for continuously moving the glass ribbon through the tank, said ribbon being immersed below the surface of said solution in the tank passing in and out said apertures, the improvement comprising, means for sealing against tank leakage and removing solution and reaction products from the ribbon, comprising transverse members carried above and below the ribbon at said entrance aperture and free from contact therewith across substantially its full width, said members defining upper and lower horizontal, vertically restricted slots adjacent the top and bottom ribbon surfaces respectively, communicating between solution inside and atmosphere outside the tank, means for evacuating the tank so as to reduce the hydrostatic pressure of the solution in the tank at the level of said upper slot to substantially atmospheric pressure and thereby balance such reduced hydrostatic pressure to substantially seal against solution outleak through said upper slot while providing limited solution outleak through said lower slot for blocking entry of air into the tank under the ribbon, and a pair of squeegees carried at the exit aperture to straddle the ribbon and engaged by both ribbon surfaces as an incident to movement of the ribbon from the tank for wiping reaction products from the glass surfaces leaving the latter substantially clean.

7. In an apparatus for simultaneous chemical treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture defining upper and lower horizontal, vertically restricted slots adjacent the top and bottom ribbon surfaces respectively, and means for evacuating said tank above said solution by an amount reducing hydrostatic pressure of the solution in the tank at the level of said upper slot to substantially atmospheric pressure whereby to provide a pressure balance between inside and outside said tank at said restricted entrance slots tending to seal against solution outleak therethrough.

8. In an apparatus for simultaneous chemical treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means for uniform application of solution to and removal from the glass ribbon surfaces comprising means at said entrance aperture free from contact with the ribbon across substantially its full width and defining upper and lower horizontal, vertically restricted slots adjacent the top and bottom ribbon surfaces respectively, means for evacuating said tank above said solution by an amount reducing hydrostatic pressure of the solution in the tank at the level of said upper slot to substantially atmospheric pressure whereby to provide a pressure balance between inside and outside said tank at said upper horizontal, vertically restricted entrance slot tending to seal against solution outleak through said upper slot with limited solution outleak through said lower slot for blocking entry of air into the tank under the ribbon, and means at said exit aperture for wiping reaction products from the ribbon surfaces and for damming solution and reaction products from flow downstream.

9. In an apparatus for simultaneous chemical treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture free from contact with the ribbon substantially its full width and defining upper and lower horizontal, vertically restricted slots adjacent the top and bottom ribbon surfaces respectively, means for evacuating said tank above said solution by an amount reducing hydrostatic pressure of the solution in the tank at the level of said upper horizontal, vertically restricted slot to substantially atmospheric pressure, whereby to provide a pressure balance at said upper restricted entrance slot between inside and outside said tank tending to seal against solution outleak through said upper slot with limited solution outleak through said lower slot for blocking entry of air into the tank under the ribbon, means defining a trough extending transversely of the ribbon under the restricted slot adjacent the bottom surface of the ribbon for receiving solution outleak through such slot, and means for returning solution outleak from said trough to said tank.

10. In an apparatus for simultaneous treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture free from contact with the ribbon across substantially its full width and defining upper and lower horizontal, vertically restricted slots adjacent the top and bottom ribbon surfaces respectively, means for evacuating said tank above said solution by an amount reducing hydrostatic pressure of the solution in the tank at the level of said upper slot to substantially atmospheric pressure whereby to provide a pressure balance at said restricted upper slots tending to seal against solution outleak therethrough with limited outleak through said lower slot, means defining a trough extending transversely of the ribbon under the restricted slot adjacent said lower bottom surface of the ribbon for receiving solution outleak through said lower slot, and exhaust means mounted above said trough adjacent the ribbon edges for drawing off fumes rising from such solution outleak laterally through said exhaust means.

11. In an apparatus for simultaneous treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture defining horizontal, vertically restricted slots adjacent the top and bottom ribbon surfaces, means for evacuating said tank above said solution whereby to provide a pressure differential at said restricted entrance slots tending to seal against solution outleak therethrough, and exhaust means mounted adjacent the ribbon edges at said restricted entrance slot for drawing off fumes rising from solution outleak laterally through said exhaust means.

12. In an apparatus for simultaneous treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture defining top and bottom horizontal, vertically restricted slots adjacent the top and bottom surfaces respectively of the ribbon, means defining with the top surface of the ribbon a pan for maintaining a first solution level above the ribbon with the hydrostatic pressure at the top restricted slot being established by said first level, means for maintaining a second solution level in the tank with the hydrostatic pressure at the bottom restricted slot being established by said second level substantially at the hydrostatic pressure at said top restricted slot, and means for evacuating said tank above said solution levels whereby to provide a pressure balance at said top restricted slot between outside atmospheric pressure and solution hydrostatic pressure tending to substantially seal against solution outleak through both said restricted slots.

13. In an apparatus for simultaneous treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture defining top and bottom horizontal, vertically restricted slots adjacent the top and bottom surfaces respectively of the ribbon and below the surface of the solution, means for maintaining the hydrostatic pressure at the top restricted slot substantially equal to the hydrostatic pressure at the bottom restricted slot substantially equal to the hydrostatic pressure at the bottom restricted slot, and means for evacuating said tank above said solution surface whereby to provide a pressure balance at said top restricted slot between outside atmospheric pressure and solution hydrostatic pressure tending to substantially seal against solution outleak through both said restricted slots.

14. In an apparatus for simultaneous treatment of both surfaces of a glass ribbon including a tank for chemical solution having entrance and exit apertures, and means for continuously moving the glass ribbon through the tank immersed in the solution below the surface thereof passing in and out said apertures, the improvement comprising, means at said entrance aperture defining top and bottom horizontal, vertically restricted slots adjacent the top and bottom surfaces respectively of the ribbon, vertically spaced weir means for maintaining two solution levels in the tank including a first solution level above the ribbon which establishes the hydrostatic pressure at the top restricted slot, and a second solution level which establishes the hydrostatic pressure at the bottom restricted slot, the vertical spacing of said weir means being such that the hydrostatic pressures at said top and bottom restricted slots are substantially equal, and means for evacuating said tank above said solution levels whereby to provide a pressure balance at said top restricted slot between outside atmospheric pressure and solution hydrostatic pressure tending to substantially seal against solution outleak through both said restricted slots.

References Cited

UNITED STATES PATENTS

| | | | |
|---|---|---|---|
| 1,440,408 | 1/1923 | Owens | 65—31 X |
| 1,777,321 | 10/1930 | Meth | 65—31 X |
| 3,023,139 | 2/1962 | Von Tetterode | 156—24 |
| 3,048,503 | 8/1962 | Foote et al. | 134—9 |

FOREIGN PATENTS 878,044　9/1961　Great Britain.

JACOB H. STEINBERG, *Primary Examiner.*

W. POWELL, *Assistant Examiner.*

UNITED STATES PATENT OFFICE
CERTIFICATE OF CORRECTION

Patent No. 3,350,248                        October 31, 1967

Henry M. Demarest, Jr., et al.

It is hereby certified that error appears in the above numbered patent requiring correction and that the said Letters Patent should read as corrected below.

Column 10, lines 33 and 34, strike out "substantially equal to the hydrostatic pressure at the bottom restricted slot".

Signed and sealed this 21st day of January 1969.

(SEAL)
Attest:

Edward M. Fletcher, Jr.
Attesting Officer

EDWARD J. BRENNER
Commissioner of Patents